US011873172B2

(12) United States Patent
DeGroot et al.

(10) Patent No.: US 11,873,172 B2
(45) Date of Patent: Jan. 16, 2024

(54) MULTI-PIECE CONVEYOR COMPONENT INCLUDING HYGIENIC CONNECTION

(71) Applicant: Laitram, L.L.C., Harahan, LA (US)

(72) Inventors: Michael Hendrik DeGroot, Rockford, MI (US); Jake A. Mohan, Grand Rapids, MI (US); Paul A. Marsman, Hudsonville, MI (US)

(73) Assignee: Laitram, L.L.C.

( * ) Notice: Subject to any disclaimer, the term of this patent is extended or adjusted under 35 U.S.C. 154(b) by 85 days.

(21) Appl. No.: 17/627,898

(22) PCT Filed: Jul. 15, 2020

(86) PCT No.: PCT/US2020/042074
§ 371 (c)(1),
(2) Date: Jan. 18, 2022

(87) PCT Pub. No.: WO2021/016011
PCT Pub. Date: Jan. 28, 2021

(65) Prior Publication Data
US 2022/0274787 A1    Sep. 1, 2022

Related U.S. Application Data

(60) Provisional application No. 62/876,344, filed on Jul. 19, 2019.

(51) Int. Cl.
*B65G 47/82*    (2006.01)
*B65G 33/32*    (2006.01)
*B65G 23/06*    (2006.01)

(52) U.S. Cl.
CPC ............. *B65G 47/82* (2013.01); *B65G 33/32* (2013.01); *B65G 23/06* (2013.01)

(58) Field of Classification Search
CPC ........ B65G 33/32; B65G 47/82; B65G 23/06; F16H 55/171; F16H 2055/173; F16H 2055/175
(Continued)

(56) References Cited

U.S. PATENT DOCUMENTS 653,659 A * 7/1900 Chillingworth ........ B65G 47/82
198/677
3,501,972 A * 3/1970 Morrow ................ F16D 1/0864
474/95
(Continued)

FOREIGN PATENT DOCUMENTS

DE    20 2010 012 454 U1 *    2/2012    ............... B30B 9/14
KR    10-1656392 B1    9/2016
WO    2018-024307 A2    2/2018

OTHER PUBLICATIONS

Extended European Search Report, European Patent Application No. 20844382.0, dated Jun. 15, 2023, European Patent Office, Munich, Germany.

*Primary Examiner* — James R Bidwell
(74) *Attorney, Agent, or Firm* — Catherine M. Bishop (57) ABSTRACT

A multi-piece component for a conveyor comprises a first section and a second section that mates with the first section around a shaft using a hygienic fastener to form a complete module. The hygienic fastener seals an interface between the fastener and the first section and between the first section and the second section. Chamfers facilitate positioning of the multi-piece component on a shaft.

19 Claims, 9 Drawing Sheets

(58) Field of Classification Search
 USPC .................................................. 198/834, 677
 See application file for complete search history.

(56) References Cited

U.S. PATENT DOCUMENTS

| | | | | |
|---|---|---|---|---|
| 3,685,367 | A * | 8/1972 | Dawson | F16D 1/08 |
| | | | | 403/312 |
| 4,964,842 | A | 10/1990 | Howard | |
| 5,037,356 | A | 8/1991 | Gladczak et al. | |
| 5,158,505 | A * | 10/1992 | Woyach | B65G 23/06 |
| | | | | 474/98 |
| 5,810,686 | A | 9/1998 | de Jong et al. | |
| 5,848,947 | A | 12/1998 | Fornasiere et al. | |
| 6,315,109 | B1 | 11/2001 | Dean | |
| 6,390,283 | B1 | 5/2002 | Goodwin | |
| 6,543,609 | B2 * | 4/2003 | Layne | B65G 21/105 |
| | | | | 198/837 |
| 6,758,776 | B2 * | 7/2004 | Fye | F16H 55/30 |
| | | | | 474/95 |
| 9,097,332 | B2 * | 8/2015 | Li | F16H 55/12 |
| 11,130,638 | B2 * | 9/2021 | Westergaard Andersen | |
| | | | | B65G 39/02 |
| 11,613,855 | B1 | 3/2023 | Johnson et al. | |
| 2013/0241157 | A1 | 9/2013 | Priu Pont | |
| 2014/0305241 | A1 | 10/2014 | Li et al. | |
| 2015/0060242 | A1 | 3/2015 | Carrara et al. | |

\* cited by examiner

MULTI-PIECE CONVEYOR COMPONENT INCLUDING HYGIENIC CONNECTION

RELATED APPLICATIONS

This application claims priority to U.S. Provisional Patent Application Ser. No. 62/876,344, filed Jul. 19, 2019, the contents of which are herein incorporated by reference.

BACKGROUND

The invention relates generally to conveyor drives and components that can be assembled on a shaft in an endless conveyor belt system.

Drives, such as sprockets and pulleys, are used to drive or otherwise engage endless power-transmission and conveyor belts and chains. Drives mounted on a drive shaft are received by a bore extending axially through the drive. A motor drives the drive shaft to impart motion to the drive. Installing a one-piece drive on a drive shaft requires that at least one bearing block on an end of the drive shaft be removed to slide the drive axially onto the shaft. Typically, the drive shaft also has to be lifted out of the conveyor side frame.

Scrolls are idle devices mounted on a shaft in a conveyor that contact the inside of a conveyor belt to move debris away from the center of the conveyor belt.

Split drives that are split along seams through their bores can be installed on drive shafts without removing bearing blocks. A first piece of the split drives is positioned on the drive shaft. Then, a complementary second piece is mated to the first piece. The two pieces are fastened to each other. Split drives and other split components may present hygiene issues and issues with properly positioning the drive on the drive shaft.

SUMMARY

One version of a shaft-mounted conveyor component embodying features of the invention comprises first and second components that mate to form a module using a hygienic connector. Recesses on the shaft may facilitate positioning of the split shaft-mounted component in a proper position.

According to one aspect, a multi-piece component for a conveyor belt comprises a first section comprising a hub for engaging a first portion of a shaft, a peripheral surface for engaging a conveyor belt and a connecting protrusion including first opening for a fastener. A second section is coupled to the first section and comprises a hub for engaging a second portion of a shaft and a second opening for the fastener configured to align with the first opening in the first section. A fastener is inserted through the first and second opening to fasten the first section to the second section. A first sealing element seals the interfaces between the fastener and the first section. A second sealing element seals the interfaces between the first section and the second section.

According to another aspect, a conveyor includes a laterally-extending shaft with a first corner chamfer and a multi-piece component mounted on the shaft. The multi-piece component includes a first section with a hub having an angled interior surface configured to engage the first corner chamfer, a peripheral surface for engaging a conveyor belt and a first opening for a fastener. A second section is coupled to the first section and comprises a hub for engaging the shaft opposite the first second and a second opening for the fastener configured to align with the first opening. A fastener is inserted through the first and second opening to fasten the first section to the second section. Sealing elements seal an interface between the fastener and the first section, and an interface between the first section and the second section.

DETAILED DESCRIPTION

A shaft-mounted conveyor component for driving, cleaning, guiding or otherwise engaging a conveyor belt comprises multiple portions that mate together about a rotatable shaft with a hygienic connection. The invention will be described below relative to certain illustrative embodiments, though the invention is not limited to the illustrative embodiments.

Figure 1:
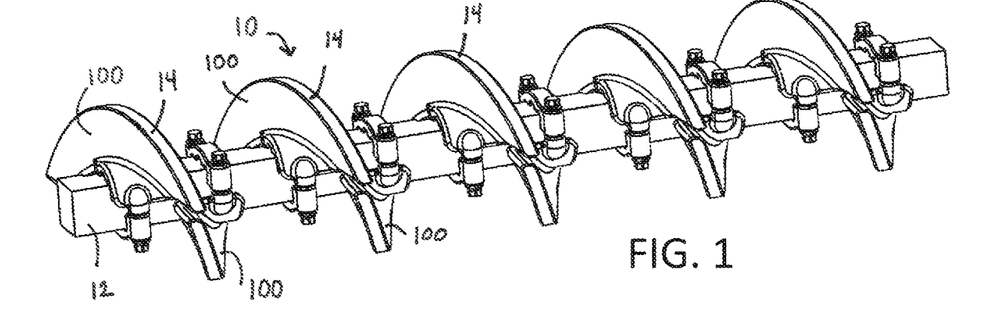
FIG. 1 is an isometric view of a shaft-mounted conveyor component comprising a plurality of helical modules arranged in series on a shaft to form a helical pulley.

One version of a split shaft-mounted component embodying features of the invention is shown in FIG. 1. The illustrative shaft-mounted conveyor component 10 is a helical pulley formed by a plurality of modules joined together. Each half-turn of the helix is formed by a pair of mating components forming a module 100. A series of modules 100 is arranged on a shaft 12, with the ends of each half-turn adjacent to each other to form the helix. The outer surface 14 of the helix forms a peripheral surface for contacting a conveyor belt to move debris away from the conveyor belt. The illustrative conveyor shaft 12 has a square-shaped cross-section, but the invention is not so limited.

Figures 2, 3:
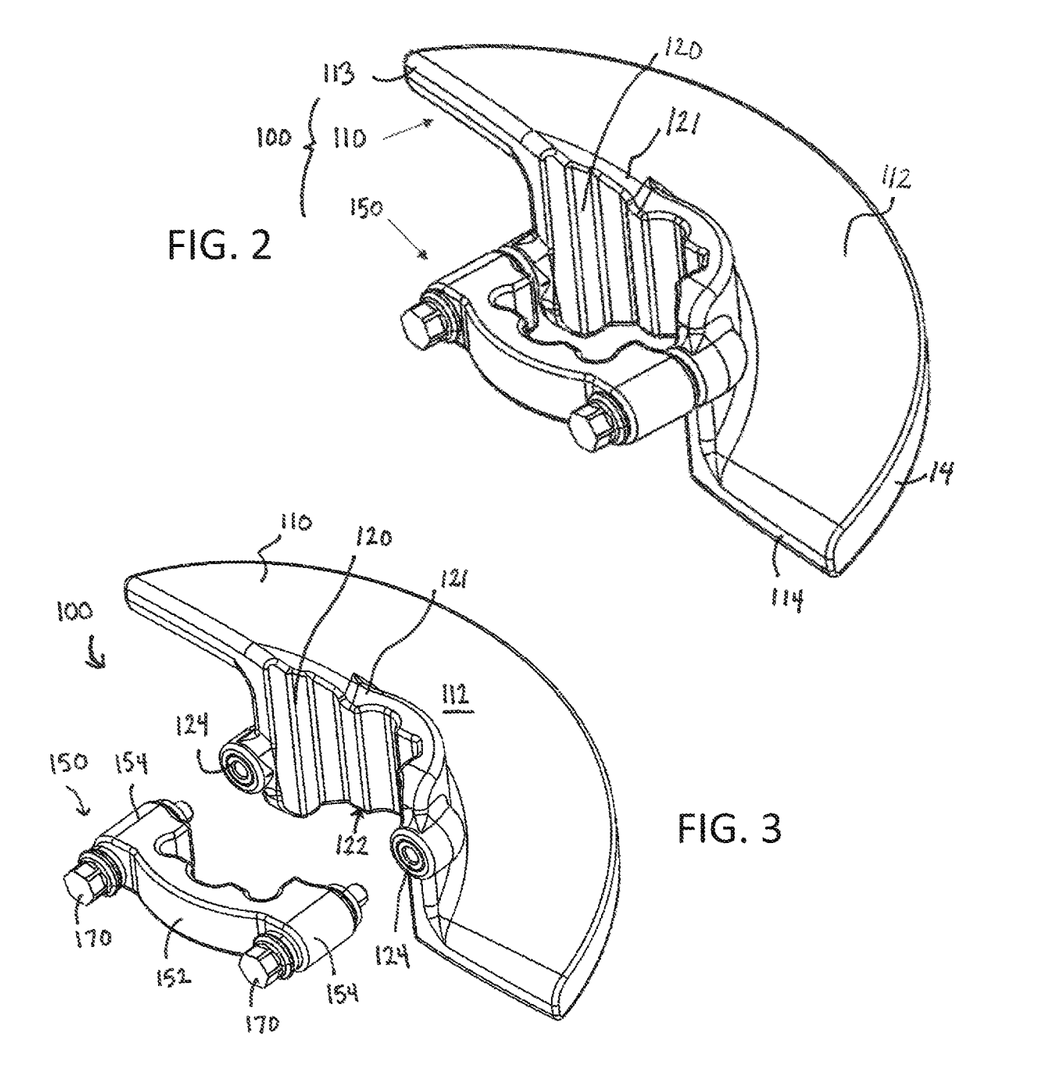
FIG. 2 is an isometric view of a helical module of the conveyor component of FIG. 1 according to an embodiment of the invention.
FIG. 3 is an isometric view of the two portions of the helical module of FIG. 2.

Referring to FIGS. 2 and 3, each module 100 comprises a scroll portion 110 forming a half-coil of the helix and a clamp portion 150 for mating with the scroll portion to affix the scroll portion to a shaft. The scroll portion 110 comprises a hub 120 for interfacing with the shaft and a web 112 extending from a first edge 113 to a second edge 114 in a helical manner. The illustrative web 112 has a consistent thickness, terminating in outer surface 14. The first edge 113 of the web aligns with a first end 121 of the hub 120 and the second edge 114 aligns with a second end 122 of the hub 120, with the web 112 arcing and twisting to form a half-coil, but the invention is not so limited. In the illustrative embodiment, the first edge 113 and second edge 114 are straight and substantially perpendicular to the axis of the shaft 12, but the invention is not so limited. The hub 120 further includes threaded openings 124, which may be inserts and may have a closed bottom, at each side for receiving fasteners to fasten the clamp portion 150 to the scroll portion 110. The web orientation may be reversed to form a helix having an opposite coil pattern.

The clamp portion 150 includes a hub forming a bridge 152 between two channels 154 configured to align with the openings 124. Fasteners 170 inserted through the channels 154 and aligned openings 124 secure the clamp portion 150 to the scroll portion 110. In one embodiment, the fasteners 170 are bolts, received and anchored in the threaded openings 124. The bridge 152 receives the opposite side of the shaft from the portion received in the hub of the associated scroll portion.

Figure 4:
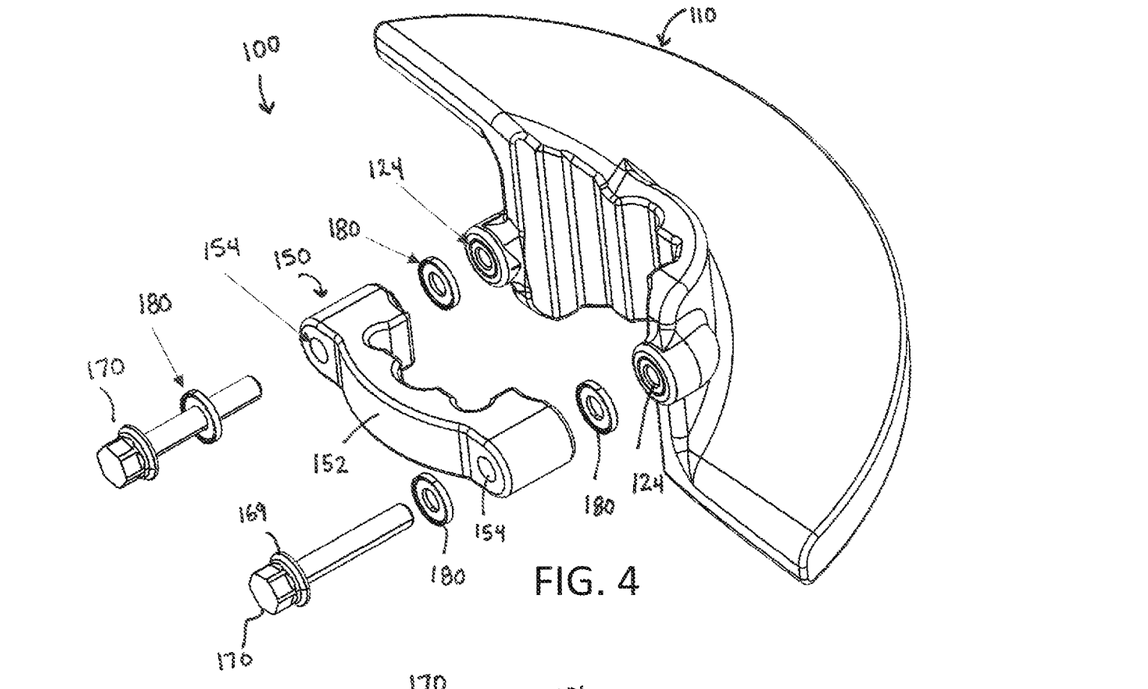
FIG. 4 is an exploded view of the helical module of FIG. 2.

Referring to FIG. 4, the module 100 further includes sealing elements, such as sealing washers 180, for sealing the interfaces between the clamp portion 150 and scroll portion 110 and between the clamp portion 150 and the heads of the bolts 170. The sealing washers 180 eliminate sandwiches to enhance hygiene. In one embodiment, a sealing washer 180 may comprises a metal flat ring seal with an elastomer rim. For example, the metal ring may have a plastic or elastomeric material, such as PTFE (polytetrafluoroethylene), EPDM (ethylene propylene diene monomer) rubber or EDT (ethylene propylene diene terpolymer), or others known in the art, bonded to the ring's outer diameter. One commercially available sealing washer is the "Hygienic Usit Ring®" available from Freudenberg Sealing Technologies of Weinheim Germany. Alternatively, a sealing element may be integrated into the fastener with a plastic material, such as Polytetrafluoroethylene (PTFE) or ethylene propylene diene monomer (EPDM), bonded to the outside diameter of the face 169 of the bolt head. Or the sealing elements may be integrated into the scroll portion and the clamp portion 150 with a process such as overmolding or 2-shot liquid silicon rubber molding.

Figure 5:
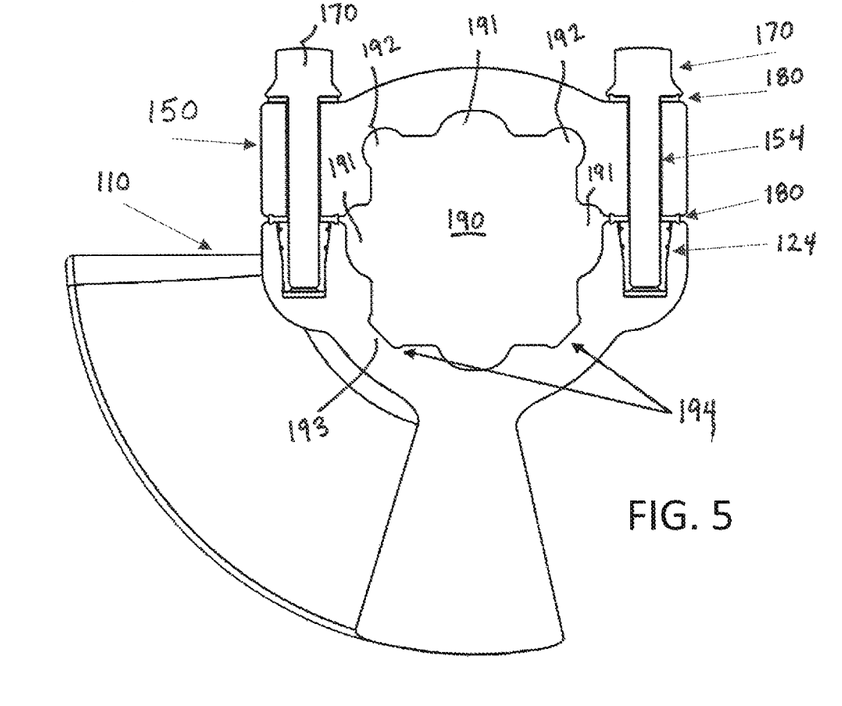
FIG. 5 is a front view of the helical module of FIG. 2.

As shown in FIG. 5, when the scroll portion 110 and clamp portion 150 are connected together using the fasteners 170, the hub 120 and bridge 152 form an opening 190 for the shaft. The illustrative opening includes cleaning recesses 191. The bridge 152 includes rounded reliefs 192 for the corners of the shaft. The hub 120 includes protrusions 193 in the form of filling structure in the hub 120 that fills in the two corners of the opening 190. In this version the protrusions are angled surfaces or chamfers 194 at the corners that interface with chamfers on the shaft to provide axial retention of the module on a shaft. Other suitable means for securing the axial position of the component relative to the shaft may be used. As also shown in FIG. 5, the bolt 170 is received in and retained by the threaded openings 124 in the hub 120 and the sealing washers 180 sealing the interfaces between the scroll portion 110 and the clamp portion 150 and between the bolts 170 and the clamp portion 150.

Figure 6:
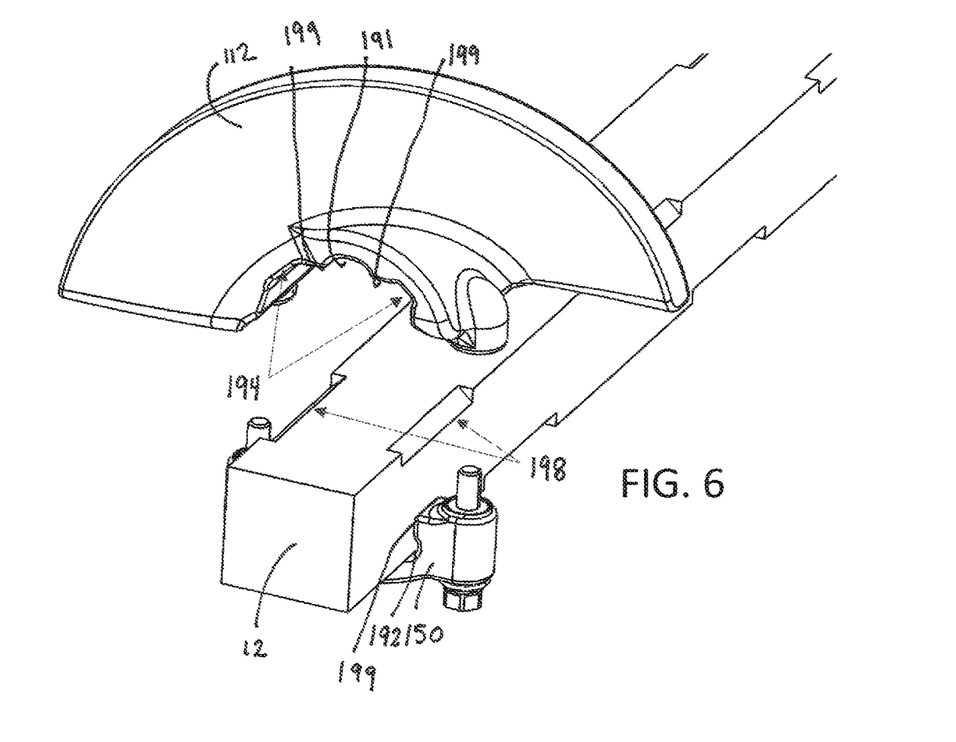
FIG. 6 is an isometric view of the helical module of FIG. 2 during assembly on a shaft.
Figure 7:
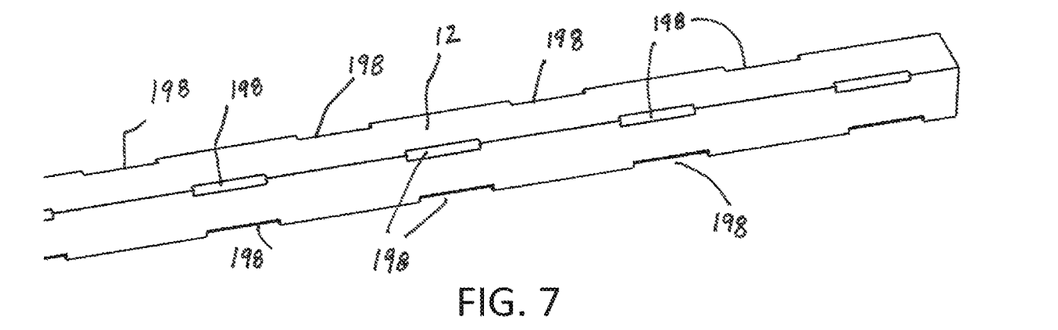
FIG. 7 is an isometric view of a shaft with chamfers suitable for receiving the helical module of FIG. 2.

Referring to FIGS. 6 and 7, a shaft 12 for receiving the modules 100 to form a helical pulley includes selected recesses, in the form of shaft chamfers 198 in selected corners of the shaft in this example, for interfacing with the angled surfaces 194 on the hub 120 to limit the axial movement of the modules 100 and to properly position the components on the shaft. The shaft has a square cross-section, but the shaft can have a cross-section in the shaft of another quadrilateral or another suitable shape. Alternatively, the shaft 12 may have recesses of other shapes and formed at other positions on the periphery of the shaft, and the one or more components 110, 150 may include complementary protrusions other than chamfers to facilitate assembly and restrict movement of the components. As shown, the shaft chamfers 198 are offset from each other to fit the corresponding angled surfaces 194 on the helix hub 120.

The clamp portions 150 are fastened to the scroll portions 110 around the shaft 12 at the positions of the shaft chamfers 198. The modules 100 may be clamped tightly to the shaft 12. But for better cleanability the modules enclose the shaft 12 with limited clearance to allow cleaning between the shaft and contact faces 199 bounding the opening 190 the cleaning recesses 191 and the rounded reliefs 192 and the angled surfaces 194. The limited clearance is great enough to allow cleaning between the shaft 12 and half the contact faces 199 during any part of the shaft's rotation. And the clearance is small enough to prevent the modules 100 from sliding axially out of their positions at the shaft chamfers.

Other suitable means for axially retaining the module 100 relative to the shaft 12 may be used, and the invention is not limited to the illustrative chamfers. For example, the hub 120 and—or bridge 152 may include a protrusion, tab, slot, recess or other feature configured to engage with a corresponding recess, slot, protrusion, tab or other feature on the shaft.

Figure 8:
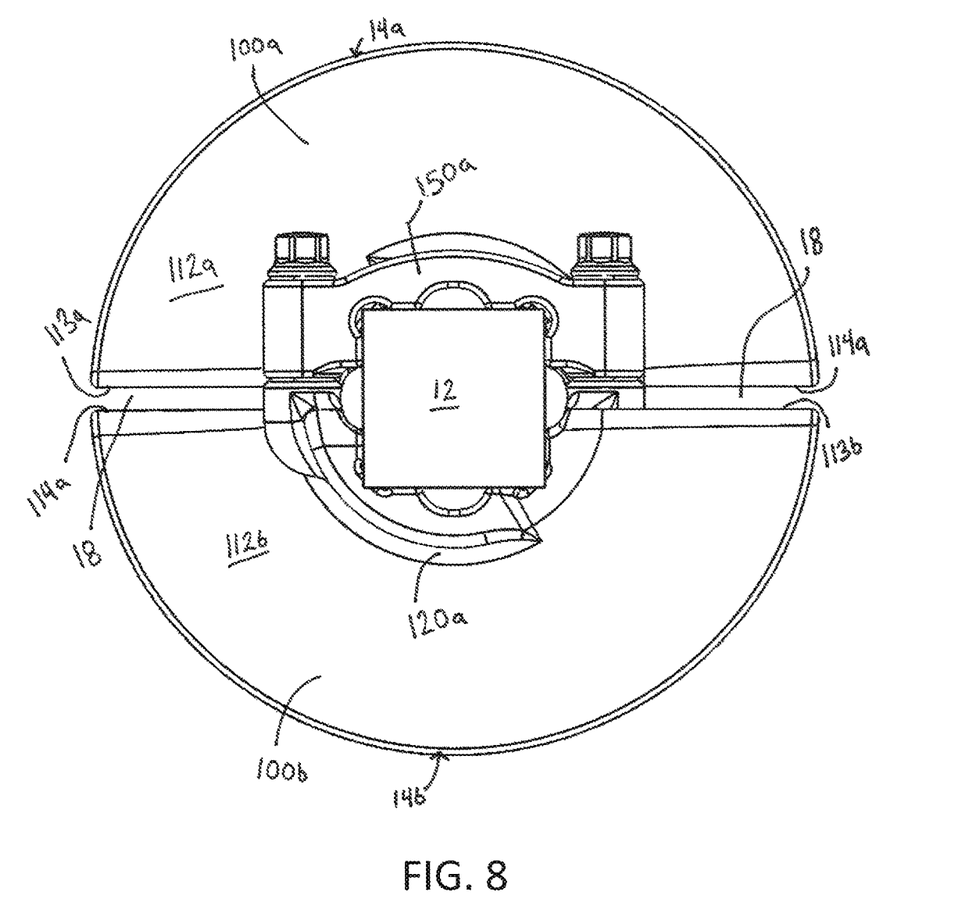
FIG. 8 is a front view of the helical conveyor pulley of FIG. 1.

Referring to FIG. 8, when multiple modules 100a, 100b are assembled on a shaft 12 to form a helix, the web edges 113, 114 have spaces 18 therebetween to facilitate cleaning.

Figure 9:
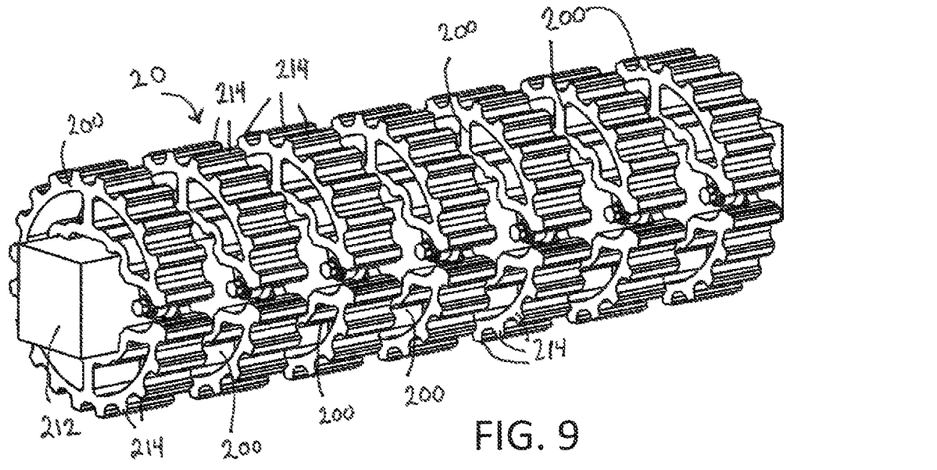
FIG. 9 is an isometric view of a conveyor drive comprising multiple mating components arranged in series according to another embodiment.
Figure 10:
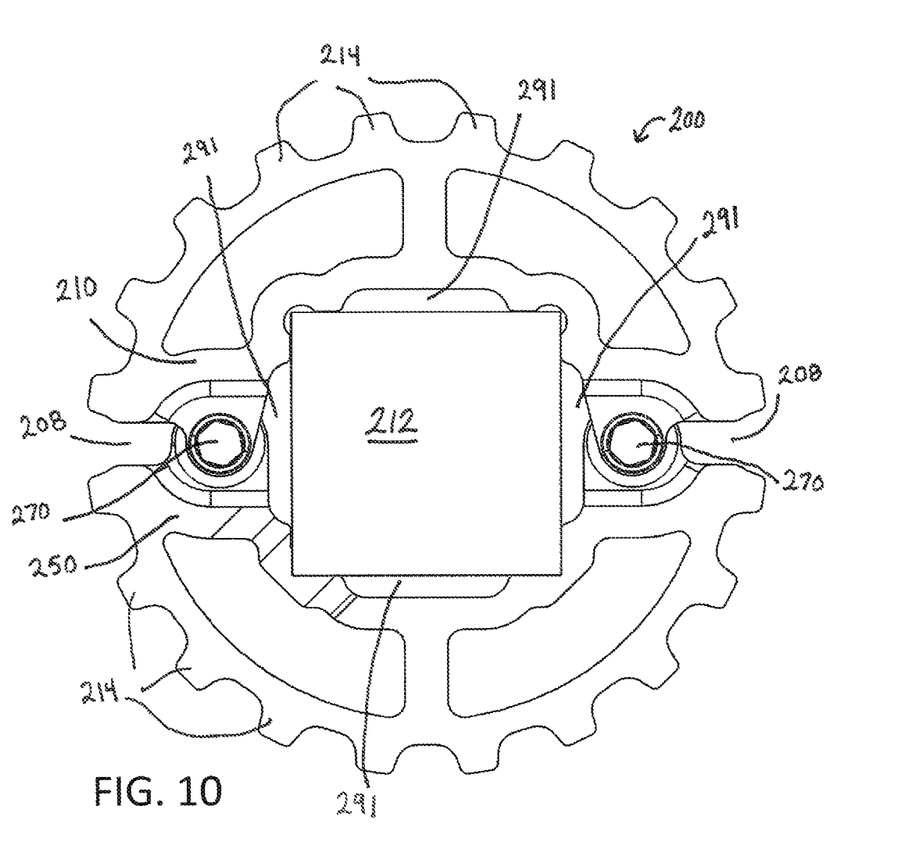
FIG. 10 is a front view of a sprocket of the conveyor drive of FIG. 9.
Figures 11, 12:
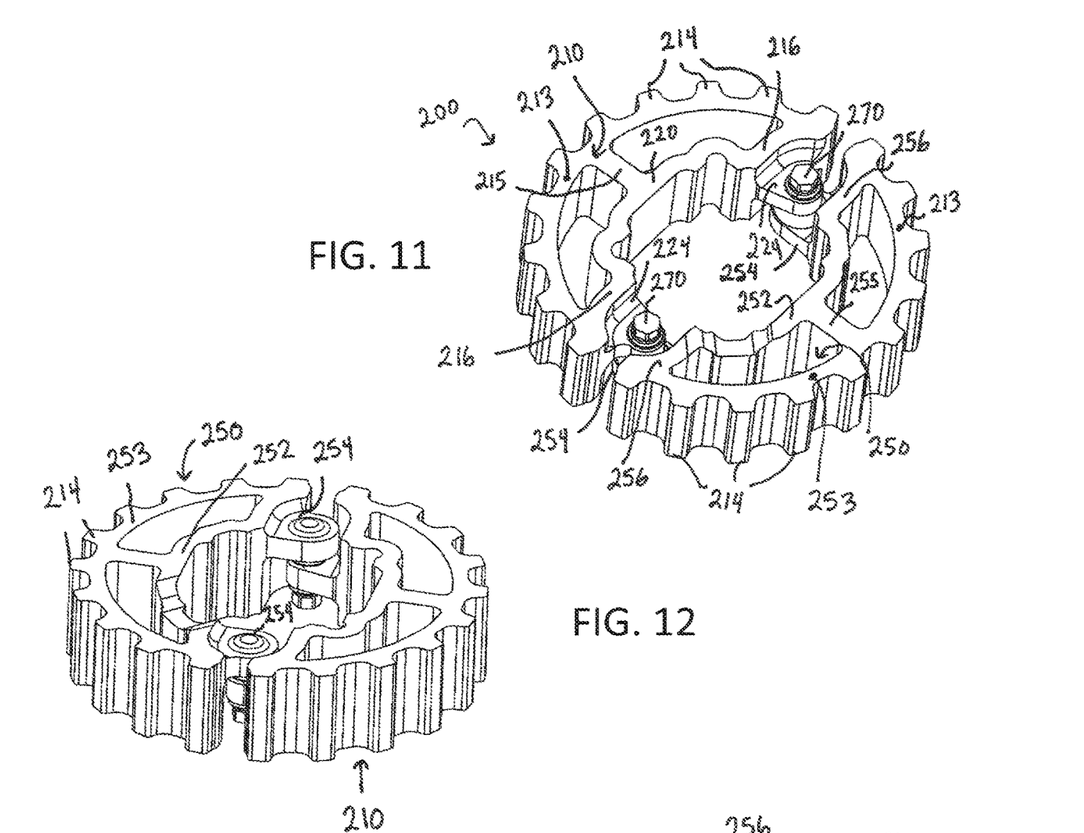
FIG. 11 is an isometric view of the sprocket of FIG. 10.
FIG. 12 is a reverse view of the sprocket of FIG. 10.
Figure 13:
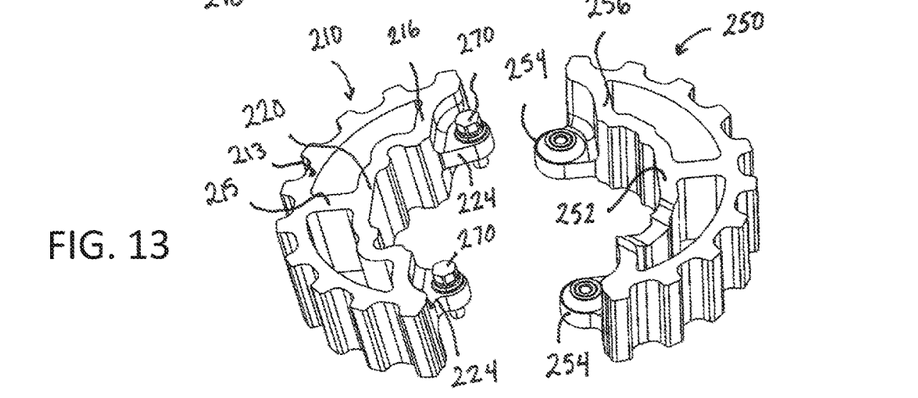
FIG. 13 is a semi-exploded view of the sprocket of FIG. 10.

FIGS. 9-10 show another embodiment of a shaft-mounted conveyor component 20 comprising multiple components fastened together using bolts as fasteners and sealing washers as sealing elements. But the sealing elements may be integrated into the fasteners or into the individual components forming the conveyor component 20. The conveyor component is a conveyor drive 20 that comprises a series of split sprockets 200 mounted to a drive shaft 212, shown as a square shaft, though the invention is not so limited. The peripheral surfaces of the sprockets 200 include teeth 214 or other features for driving a conveyor belt. Each sprocket 200 is formed by a pair of mating components 210, 250 assembled together around the shaft 212 and coupled together using fasteners 270. The illustrative sprocket includes gaps 208 between the components and cleaning windows 291 to facilitate cleaning and promote hygiene.

Referring to FIGS. 11-14, a first mating component 210 comprises a hub 220 for engaging a portion of the shaft 212. The hub connects to an outer rim 213 that forms the drive teeth 214 by a central spoke 215 and lateral spokes 216 at the ends of the hub. Shaped connecting tabs 224 extend from the lateral spokes 216 and include channels for receiving the fasteners, shown as bolts 270.

The second mating component 250 comprises a hub 252 for engaging an opposite portion of the shaft from the first hub 220. The hub 252 connects to an outer rim 253 with drive teeth 214 via a central spoke 255 and lateral spokes 256. Connecting tabs 254 extend from the lateral spokes and include threaded openings, which may be inserts, and may be a closed bottom, for capturing the bolts 270 to secure the two components to each other and on a shaft. In an embodiment, the bolts 270 are recessed related to the spokes 216, 256 and the rest of the mating components 210, 250 (i.e., not protruding past the thickness of the sprocket) when the sprocket 200 is assembled to allow close, even stacked, spacing of several sprockets 200 on a shaft. In an embodiment, the threaded openings 254 may be initially offset from the channels 224 and pushed into alignment to control orientation of the mating components.

Figure 14:
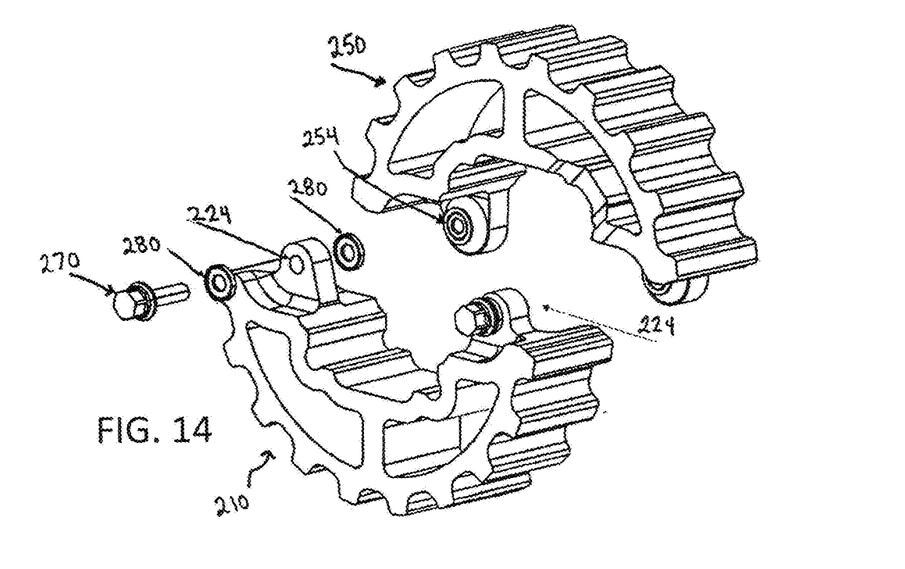
FIG. 14 is an exploded view of the sprocket of FIG. 10.

As shown in FIG. 14, sealing washers 280 seal the interfaces between the first component 210 and second component 250 and between the first component 210 and the head of the fastening bolt 270.

In another embodiment of the invention, a mating component 210 or 250 may include one connecting tab having a through channel and another connecting tab having a threaded opening, which may be closed and may comprise a threaded insert, with the connecting tabs offset so as to mate with a corresponding mating component also having each type of opening.

Figure 15:
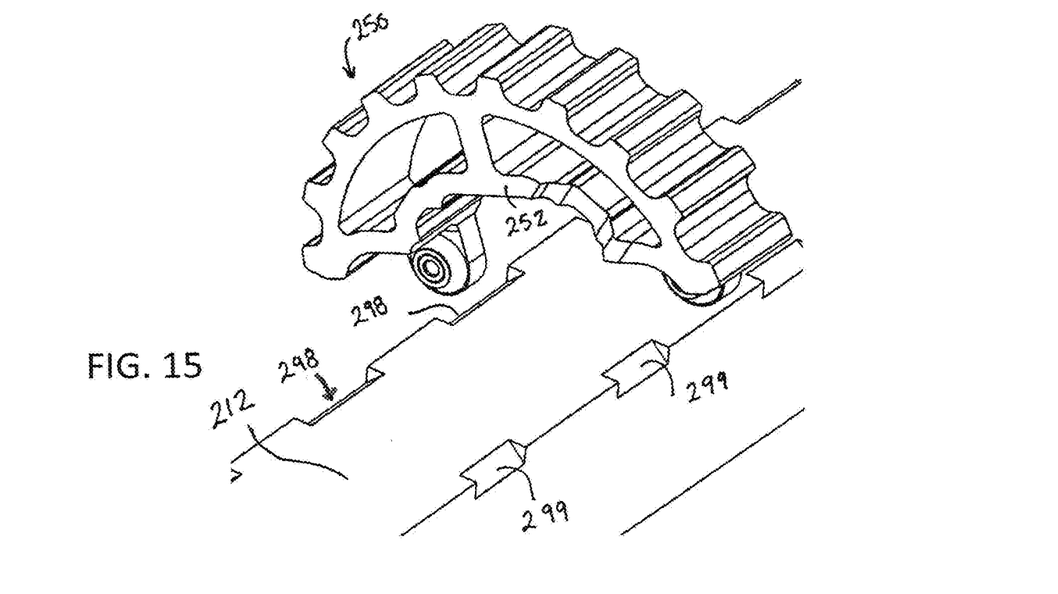
FIG. 15 shows a first mating component of the sprocket of FIG. 10 during assembly on a driveshaft.
Figure 16:
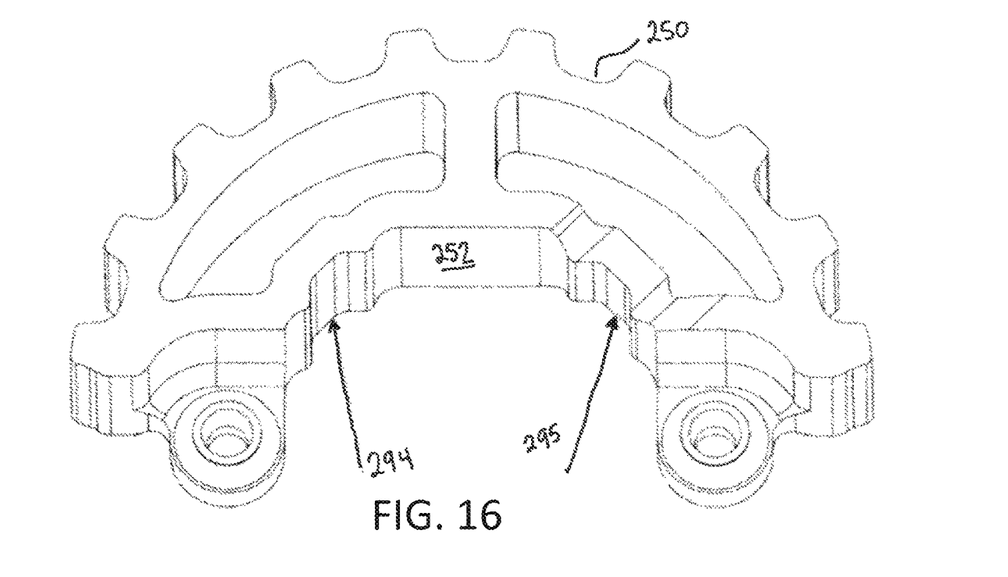
FIG. 16 is an isometric bottom view of the first mating component of FIG. 15, detailing uneven chamfers.
Figure 17:
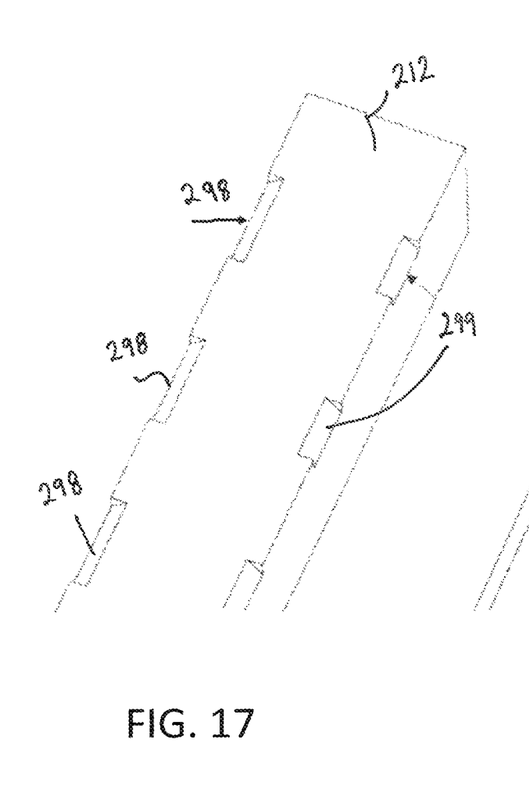
FIG. 17 shows a shaft with uneven chamfers suitable for receiving the first mating component of FIG. 16.

Referring to FIGS. 15 and 16, a mating component for a drive, shown as the mating component 250, may include chamfers in a hub 252 for interfacing with chamfers 298, 299 on an associated shaft 212. The chamfers ensure proper orientation and prevent migration of the drive along the drive shaft. As shown in FIG. 16, a first hub chamfer 294 may be wider than a second hub chamfer 295, caused by reducing the thickness of the hub 252' around the second hub chamfer 295 in a mating component 250. The associated shaft 212, shown in FIG. 17, may have first chamfers 298 at a first edge that are wider than second chamfers 299 at a second edge to mate with the chamfers 294, 295, respectively, thus ensuring proper orientation of the assembled drive 200 on the shaft 212. Like the scroll modules 100 of FIG. 6, the two mating components 210, 250 do not necessarily have to be tightly clamped to the shaft 212. Rather, they may be fastened together so as to merely enclose the shaft 212 with a limited clearance—enough to allow cleaning of the contact surfaces on the hubs 220, 252 bounding the shaft opening as the shaft completes one rotation.

Figure 18:
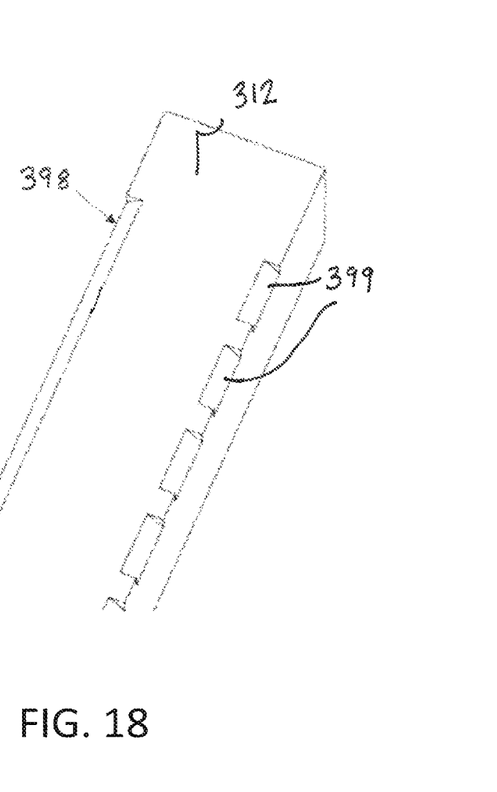
FIG. 18 shows a shaft with a continuous chamfer suitable for mounting a series of stacked sprockets.

As shown in FIG. 18, a drive shaft 312 may include a continuous chamfer 398 on a first edge with selectively spaced chamfers 399 on an opposite edge for accommodating a series of stacked sprockets 200 on the shaft.

Figure 19:
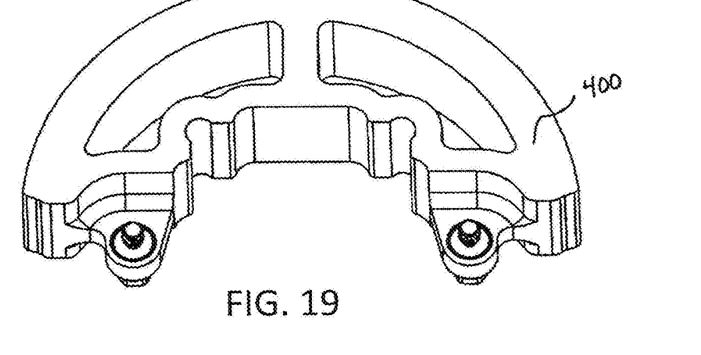
FIG. 19 shows a conveyor component comprising a half disk.

FIG. 19 shows one half of a shaft-mounted component similar to the split sprocket of FIG. 16. A half disk 400 is used with a complementary half disk to form a shaft-mounted disk used to support a conveyor belt and serve, for example, with other such multi-part disks mounted on the shaft as part of a return roller system in a conveyor-belt return run. The half disk 400 differs from the halves of the split sprocket in the in that its rim is smooth—devoid of teeth or other belt engagement structure.

Figure 20:
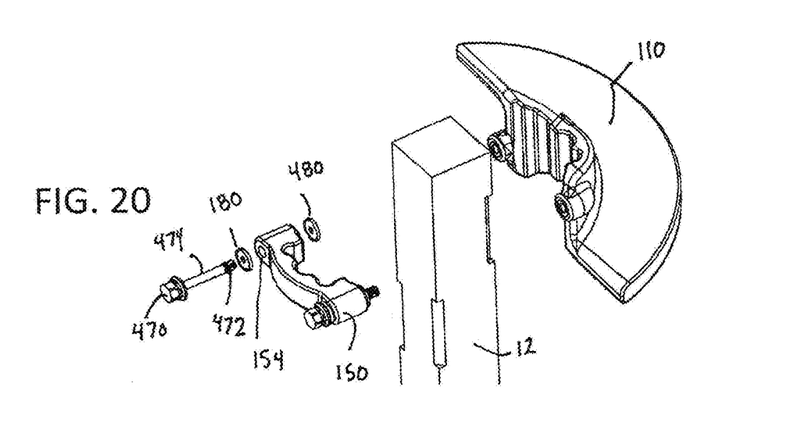
FIG. 20 is a partially exploded isometric view of another version of a helical module as in FIG. 2 with a clamp portion having retained fastening hardware.

In FIG. 20, the fasteners are held captive to the clamp portion 150. A reduced shank bolt or screw 470 has a threaded end 472. The outer diameter of the threads 472 is greater than the diameter of the bolt's shank 474. After the bolt 470 with the outer sealing washer 180 is inserted through the channel 154, a sealing washer 480 having a threaded inner bore is threaded onto and past the threaded end 472 so that it sits on the reduced diameter shank 474. The internally threaded sealing washer 480 is captured on the bolt 470, and the bolt is captured by the threaded sealing washer in the bore of the clamp portion 150. So, when the clamp portion is unfastened from the scroll portion 110, the bolts 470, the washers 180, 480, and the clamp portion 150 remain together. They are separated only by intentionally unscrewing the internally threaded sealing washers 480 from the reduced shank bolt 470. The same captured fasteners can be used with other multi-part shaft-mounted components, including the split sprocket and the split disk.

Figure 21:
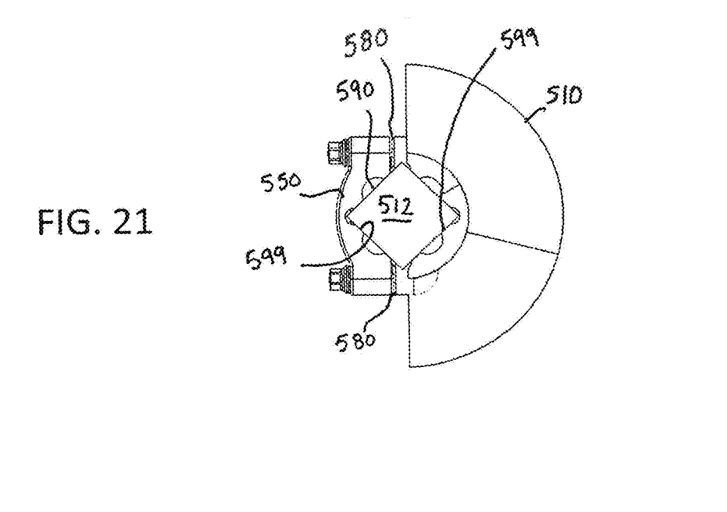
FIG. 21 is an axial view another version of a shaft-mounted conveyor component embodying features of the invention.

Another version of the scroll module is shown on FIG. 21. The scroll portion 510 and the clamp portion 550 are split along a diagonal of a square central opening 590 for a rectangular shaft 512. The penetration depth of contact faces 599 from the hubs into the opening 590 is deep enough for the clamp portion and the scroll portion to be clamped together on the shaft 512 and against the sealing washers 580.

Although the invention has been described with reference to a few versions, other versions are possible. The scope of the invention is not meant to be limited to the details of the various exemplary versions.

What is claimed is:

1. A multi-piece component for a conveyor belt comprising:
   a first section comprising a hub for engaging a first portion of a shaft, a peripheral surface for engaging a conveyor belt and a connecting protrusion including first opening for a fastener;
   a second section coupled to the first section comprising a hub for engaging a second portion of a shaft, the second section including a second opening for the fastener configured to align with the first opening in the first section; and
   a fastener inserted through the first and second opening to fasten the first section to the second section; and
   a first sealing element comprising a first metal washer with a plastic bonded to an outside diameter, the first sealing element sealing the interfaces between the fastener and the first section, and a second sealing element comprising a second metal washer with a plastic bonded to an outside diameter, the second sealing element sealing the interfaces between the first section and the second section.

2. The multi-piece component of claim 1, wherein the plastic comprises polytetrafluoroethylene or ethylene propylene diene monomer.

3. The multi-piece component of claim 1, wherein the first section includes a helical web.

4. The multi-piece component of claim 1, wherein the first section includes a circular half disk.

5. The multi-piece component of claim 1, wherein the first and second sections include an outer rim comprising drive teeth for engaging a conveyor belt.

6. The multi-piece component of claim 1, wherein the hub of the first section includes a protrusion for engaging with a recess on the shaft.

7. The multi-piece component of claim 6, wherein the recess is a first chamfer and the protrusion is a complementary second chamfer.

8. The multi-piece component of claim 7, wherein the hub of the first section includes a third chamfer that is thinner than the second chamfer for engaging a fourth chamfer on the shaft.

9. The multi-piece component of claim 1, wherein the fastener includes a reduced shank bolt with a threaded end and a reduced diameter shank and wherein the second sealing element is internally threaded and is screwed along the threaded end and onto the shank to be retained on the shank unless intentionally unscrewed from the bolt.

10. The multi-piece component of claim 1, wherein the first and second openings form an opening to receive a square shaft enclosed by the first and second sections fastened together.

11. The multi-piece component of claim 10, wherein the first and second sections are split along a diagonal of the opening.

12. The multi-piece component of claim 10, wherein the first and second sections are split along a side of the opening.

13. The multi-piece component of claim 1, wherein the first and second sealing elements are integrated into the first section with a process.

14. In a conveyor for moving items longitudinally from a first end to a second end,
   a laterally-extending shaft with a first corner chamfer; and
   a multi-piece component mounted on the shaft, comprising:
      a first section including a hub with an angled interior surface configured to engage the first corner chamfer, a peripheral surface for engaging a conveyor belt and a first opening for a fastener;
      a second section coupled to the first section comprising a hub for engaging the shaft opposite the first section, the second section including a second opening for the fastener configured to align with the first opening;
      a fastener inserted through the first and second opening to fasten the first section to the second section; and
      sealing elements for sealing an interface between the fastener and the first section, and an interface between the first section and the second section.

15. The conveyor of claim 14, further comprising a second corner chamfer on the shaft that is thinner than the first corner chamfer.

16. The conveyor of claim 15, wherein the hub of the first section includes a second angled interior surface that is thinner than the first angled interior surface for engaging the second corner chamfer on the shaft.

17. The conveyor of claim 14, wherein the sealing elements are metal washers with a plastic bonded to the metal washers' outside diameter.

18. A multi-piece component for a conveyor belt comprising:
   a first section comprising a hub for engaging a first portion of a shaft, a peripheral surface for engaging a conveyor belt and a connecting protrusion including first opening for a fastener;
   a second section coupled to the first section comprising a hub for engaging a second portion of the shaft, the second section including a second opening for the fastener configured to align with the first opening in the first section; and
   a fastener inserted through the first and second opening to fasten the first section to the second section, the fastener comprising a reduced shank bolt with a threaded end and a reduced diameter shank; and
   a first sealing element that seals the interfaces between the fastener and the first section, and a second sealing element that seals the interfaces between the first section and the second section, wherein the second sealing element is a sealing washer that is internally threaded and is screwed along the threaded end and onto the reduced diameter shank to be retained on the reduced diameter shank unless intentionally unscrewed from the reduced shank bolt.

19. A multi-piece component for a conveyor belt comprising:
   a first section comprising a hub for engaging a first portion of a shaft, a peripheral surface for engaging a conveyor belt and a connecting protrusion including first opening for a fastener;
   a second section coupled to the first section comprising a hub for engaging a second portion of a shaft, the second section including a second opening for the fastener configured to align with the first opening in the first section; and
   a fastener inserted through the first and second opening to fasten the first section to the second section, wherein the fastener has a bolt face; and
   a first sealing element comprising a plastic material bonded to the outside diameter of the bolt face to seal the interfaces between the fastener and the first section, and a second sealing element that seals the interfaces between the first section and the second section.

* * * * *